UNITED STATES PATENT OFFICE 1,951,555

POLISHING GRAIN AND SURFACE TREATMENT OF SAME

Jacob S. Masin, Anniston, Ala., assignor to Swann Research, Incorporated, a corporation of Alabama No Drawing. Application February 1, 1932, Serial No. 590,324

3 Claims. (Cl. 51—279)

This invention relates to an improved abrasive grain suitable for polishing purposes and in particular to a grain having a surface upon which an adhesive agent can exert greater tenacity.

One object of this invention, therefore is to provide a process for treating abrasive grain surfaces which will impart greater tenacity to the glue bond between the grain and the paper or cloth backing or support. Another object is to provide an abrasive grain having the above mentioned characteristics.

Abrasive grain as ordinarily produced has a shiny surface to which glue or other aqueous binding agent does not readily adhere. It also possesses inferior packing qualities which are particularly manifest when the grain is mixed with liquid glue and the plastic mass is worked by hand or in a mixing machine.

Well known methods for improving the adhesiveness of such grains consist in acid etching the grain. This procedure I have found to be undesirable because of the selective etching of the acid on the matrix of the grain in which the crystals are set resulting in a more rapid breakdown of grain during use.

I have now found that if abrasive grain, which is to be employed for the making of polishing wheels or papers, be first treated with certain metallic salts, particularly iron and aluminum salts, and heated to decomposing temperatures, the resulting grain will possess a better workability with glue and a greatly improved tenacity towards the glue bond ordinarily used to affix same to paper or cloth, without resulting in a weakening of the grain.

The metallic salts, which I have found useful for this purpose, are the water soluble salts such as the chlorides, nitrates, or sulphates of the metals ordinarily classified by analysts as coming in the aluminum and iron groups. These metals are aluminum, zinc, chromium, manganese, iron, cobalt, and nickel. These metals form water soluble chlorides, nitrates, and sulphates and may be employed in the form of these salts, dissolved in water solution.

I may also incorporate with the solution used to treat the abrasive grain an amount of sodium silicate or water glass and thus obtain a somewhat improved surface.

The abrasive grain, which I treat by my improved process may be either a regular aluminous abrasive or silicon carbide grain, or a natural grain such as emery or garnet as I have found that any of these products may be considerably improved by my process.

The following example will illustrate one way in which my improved process may be practiced, as applied to ordinary aluminous abrasive grains:

A stock solution is made up of 75 c. c. of 30% aluminum chloride ($AlCl_3$), 25 c. c. of 20% iron chloride ($FeCl_3$), and 75 c. c. of a 5% (by volume) sodium silicate solution. The sodium silicate, or commercial water glass, used has a specific gravity of 1.30.

The aluminous abrasive grain, say of 60 mesh size, is now steeped in this solution until thoroughly wetted, allowed to drain and then heated in a kiln or muffle furnace to about 310° C. At this temperature some of the material on the surface of the grain is volatilized and some is decomposed, the residue on the grain surface being sufficient to color the grain a dull reddish-brown. Grain thus prepared will exhibit a considerably greater capillarity than untreated grain. It is also more easily wetted by glue or other cements and hence these adhesives will cause the abrasive grain to be more firmly held to the paper or cloth backing than is the case with untreated grain.

Other salts than those above mentioned may be used for the purpose herein described, and these may be used with or without the sodium silicate, although for best results I recommend the use of the silicate as described. When salts other than the chloride or nitrate is used a somewhat higher heating temperature may be desirable in order to effect decomposition. This decomposition need not be complete, in other words the grain may show, after heating, a small amount of water soluble salt. It is desirable, however, to heat to a temperature sufficient to cause most of the salt present to decompose and leave on the grain surface a fine coating consisting of a residue of metallic oxides and silicates of the salts employed.

The properties identifying my improved abrasive grain are a dull matte surface usually red to reddish-brown and an increased capillarity. The capillarity of abrasive grain is usually measured by determining the rise in water level in a glass tube packed with the abrasive. Whereas untreated aluminous oxide grain of 60 grit size shows a capillary rise, ordinarily referred to as "capillarity" of 9 to 9.6 cm. in 3.5 minutes, grain treated by my process exhibits a rise of 15 to 16 cm. in 3.5 minutes.

Having now particularly described my invention, what I claim is:—

1. Abrasive grain having on its surface the decomposition products of salts of the aluminum and iron groups associated with sodium silicate.

2. Process of coating abrasive grain and thereby improving the tenacity characteristics of said grain towards adhesives, consisting in wetting said grain with a water solution of iron and aluminum chlorides and sodium silicate, then heating said grain to a temperature sufficient to partly decompose said salts and leave a residue of said salts on said grain.

3. Process of coating abrasive grain and thereby improving the tenacity characteristics thereof towards adhesives, consisting in wetting said grain with an aqueous solution having the following approximate composition:—75 c. c., 30% aluminum chloride solution, 25 c. c., 20% iron chloride solution, 75 c. c., 5% (by volume) sodium silicate (or water glass), then heating said grain to effect a decomposition of said salts and leave a residue thereof on said grain.

JACOB S. MASIN.